United States Patent Office 3,657,239
Patented Apr. 18, 1972

3,657,239
OCTAHYDROPYRIDAZINO[1,2-a]PYRIDAZINES
William J. Houlihan, Mountain Lakes, N.J., assignor to Sandoz-Wander, Inc., Hanover, N.J.
No Drawing. Original application July 14, 1967, Ser. No. 653,351. Divided and this application Feb. 2, 1970, Ser. No. 7,995
Int. Cl. C07d 51/04
U.S. Cl. 260—250 A
10 Claims

ABSTRACT OF THE DISCLOSURE 2-substituted aryl - 1,6 - diazabicyclo[4.4.1]undecanes, e.g., 2-phenyl-1,6-diazabicyclo[4.4.1]undecane, are prepared from the $N_5$-methyl halide salts of 1-substituted aryl - 1,2,3,4,6,7,8,9 - octahydropyridazino[1,2-a]pyridazines and are useful as central nervous system stimulants.

This application is a division of patent application Ser. No. 653,351, filed July 14, 1967.
This invention relates to novel heterocyclic compounds. In particular, the invention pertains to 1,6-diazabicyclo-[4.4.1]undecanes and methods for preparing the same. The invention also relates to intermediates which are useful in preparing the above compounds and processes for preparing said intermediates.
The undecanes of the present invention may be represented structurally as follows:

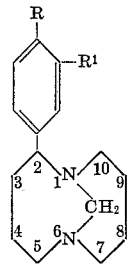

I wherein each of R and $R^1$ represent hydrogen; chloro; fluoro; or straight chain lower alkoxy, preferably containing from 1 to 4 carbon atoms, i.e., methoxy, ethoxy, propoxy and butoxy.

The above compounds may be prepared by converting a 4 - aryl-4-hydroxy-3,4,6,7,8,9-hexahydropyridazino[1,2-a]pyridazin-1(2H)-one (or tautomer thereof) to the corresponding 4-aryl - 6,7,8,9 - tetrahydropyridazino[1,2-a] pyridazin-1(2H)-one, hydrogenating the latter to form the corresponding 4 - aryl - 3,4,6,7,8,9-hexahydropyridazino-[1,2-a]pyridazin-1(2H)-one, reducing the latter to form the corresponding 1-aryl-1,2,3,4,6,7,8,9-octahydropyridazino[1,2-a]pyridazine which in turn is reacted with an alkyl halide to form the $N_5$-alkyl halide salt thereof. The latter is then converted to the desired 1,6-diazabicyclo-[4.4.1]undecane by treatment with an alkali metal alkoxide. The overall process is illustrated by the following reaction scheme:

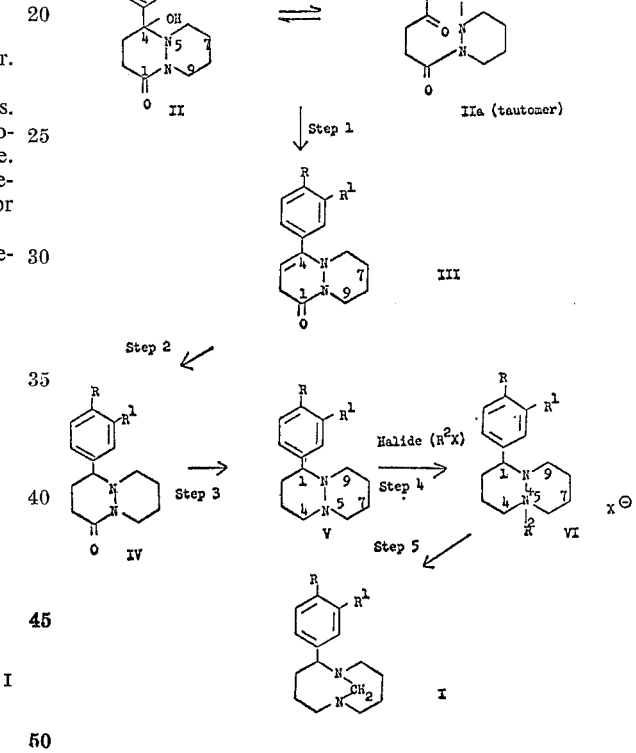

wherein R and $R^1$ are as defined above, $R^2$ represents methyl and X represents halogen having an atomic weight of at least 35, i.e., chloro, bromo or iodo.

In Step 1 of the process, a 4-hydroxy-3,4,6,7,8,9-hexahydropyridazino[1,2-a]pyridazin - 1(2H) - one (II) (or tautomer thereof IIa) is converted to the corresponding 6,7,8,9 - tetrahydropyridazino[1,2 - a]pyridazin - 1(2H)-one (III). This reaction is conveniently carried out in the presence of an inert organic solvent and at elevated temperatures. However, neither the solvent nor temperature employed is critical. Suitable solvents include benzene, toluene, xylene and chlorobenzene. Preferably, the reaction is carried out at reflux temperature to facilitate continuous removal of water. To facilitate the formation of water, the reaction may be carried out in the presence of a catalytic amount of hydrogen ions such as by the use of an arylsulfonic acid, e.g., benzenesulfonic acid, p-toluenesulfonic acid and the like. The resulting product (III) can be readily isolated employing conventional techniques.

Step 2 of the process involves the catalytic reduction of a 6,7,8,9-tetrahydropyridazino[1,2-a]pyridazin-1(2H)-one (III) to the corresponding 3,4,6,7,8,9 - hexahydropyridazino[1,2-a]pyridazin-1(2H)-one (IV). The reduction is most readily effected in an inert organic solvent, desirably a lower aliphatic acid, preferably acetic acid, and in the presence of a platinum catalyst, e.g., platinum, platinum-carbon, platinum - alumina, platinum - asbestos and platinum dioxide. The reduction may be carried out at room temperature (20–25° C.) or at elevated temperatures of up to about 75° C. Preferably, the temperature is in the range of from about 20° to about 30° C. and the hydrogen pressure is in the range of from about 15 to about 100 p.s.i. The resulting product (IV) is readily recovered in conventional manner.

The reduction (Step 3) of the 3,4,6,7,8,9-hexahydropyridazino[1,2-a]pyridazin-1(2H)-one (IV) to the corresponding 1,2,3,4,6,7,8,9-octahydropyridazino[1,2-a]pyridazine (V) is readily carried out employing a hydride reducing agent, preferably an aluminum hydride, such as lithium aluminum hydride, butyl aluminum hydride, tri-isobutyl aluminum hydride and the like. The reduction is conveniently effected in the presence of an inert organic solvent and at an elevated temperature, preferably reflux temperature. Suitable solvents include the ethers, such as diethyl ether and the like, and mixtures of ethers and benzene or toluene. However, neither the solvent nor temperature employed is critical. The resulting product (V) is readily isolated employing conventional techniques.

Steps 4 and 5 of the process involve the introduction of an alkyl substituent into the ring system followed by formation of the bridged 1,6-diazabicyclodecane. In Step 4 the pyridazine (V) is reacted with an alkyl halide ($R^2X$) to form the corresponding $N_5$-$R^2$ halide salt thereof (VI). This reaction is conveniently carried out in the presence of a suitable inert organic solvent, such as, for example, diethyl ether, pentane, hexane, benzene, toluene, xylene and chloroform. It is preferred to carry out the reaction at room temperature or below although elevated temperatures up to reflux temperature can be employed if desired. The resulting halide salt (VI), which is readily isolated employing conventional techniques, is then converted to the desired corresponding bridged 1,6-diazabicyclodecane (I) by reacting the halide salt (VI) with an alkali metal alkoxide (Step 5). Suitable alkoxides include the lithium, potassium and sodium derivatives of lower aliphatic alcohols, such as, for example, lithium methoxide, sodium methoxide, sodium ethoxide, potassium methoxide, potassium ethoxide and the like. The reaction is conveniently carried out in a suitable inert organic solvent such as an aliphatic alcohol, for example, methanol, ethanol, propanol and the like, and at an elevated temperature, preferably reflux temperature. However, neither the solvent nor temperature employed is critical. The bridged diazabicyclodecane (I) is readily recovered in conventional manner.

With respect to the various steps of the process discussed above, it is possible that the solvent employed therein can be dispensed with if any of the reactants are liquids at the temperature at which the reaction is conducted. In such instances, an excess of such reactant can be used in lieu of the solvent.

The starting compounds (II or IIa) employed in the above process can be prepared by reacting an appropriate 3-benzoylpropionic acid with an alkyl- or arylchlorocarbonate and reacting the resulting intermediate with hexahydropyridazine. Alternatively, such compounds may be prepared by reacting an appropriate 3-benzoylpropionyl halide with hexahydropyridazine. These processes are illustrated by the following reaction scheme:

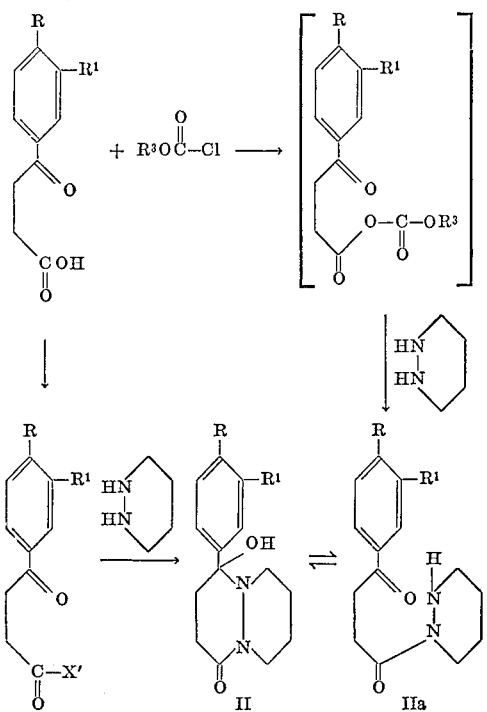

wherein R and $R^1$ are as previously defined, X' represents chloro or bromo and $R^3$ represents alkyl, e.g., ethyl, or aryl, e.g., phenyl.

The reaction of the 3-benzoylpropionic acid with the chloroformate is carried out in a suitable inert organic solvent, e.g., chloroform, and in the presence of a tertiary amine, e.g., triethylamine, which is utilized to take up the liberated hydrogen halide formed during the reaction. Desirably, the reaction is carried out under cooled conditions (ice-bath). The resulting intermediate is then reacted in situ with hexahydropyridazine to form the desired product. This latter reaction can be carried out at room temperature. In the alternative procedure, the 3-benzoylpropionyl halide is reacted with hexahydropyridazine in an inert organic solvent, e.g., chloroform, and in the presence of a tertiary amine to take up the liberated hydrogen halide. This reaction is desirably carried out under cooled conditions (ice-bath). The benzoylpropionyl halide is readily obtained from the corresponding acid by treatment with thionyl chloride or thionyl bromide in conventional manner. Various of the 3-benzoylpropionic acids employed in the process are known and can be prepared as described in the literature. Such others which may not be specifically described in the literature may be prepared from available materials in analogous manner.

All of the compounds of structural Formulas I, II, IV, V and VI have asymmetric centers and therefore exist as optically active isomers. Separation and recovery of the respective isomers may be readily accomplished employing conventional techniques and such isomers are included within the scope of this invention.

The compounds of Formula I are useful because they possess pharmacological activity in animals. In particular, the compounds are central nervous system stimulants and can be used as anti-depressants. For such use the compounds may be combined with a pharmaceutically acceptable carrier, and such other conventional adjuvants, as may be necessary, and administered orally or parenterally. Furthermore, the compounds may be similarly administered in the form of their non-toxic pharmaceutically acceptable acid addition salts. Such salts possess the same order of activity of the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

For the above-mentioned use, the dosage will, of course, vary depending upon the compound employed and mode of administration. However, in general, satisfactory results are obtained when administered at a daily dosage of from about 5 milligrams to about 20 milligrams per kilogram of animal body weight preferably given in divided doses, 2 to 4 times a day, or in sustained release form. For most mammals (e.g. primates) the total daily dosage is from about 50 milligrams to about 200 milligrams and dosage forms suitable for internal administration comprise from about 12.5 milligrams to about 100 milligrams of the compound in admixture with a solid or liquid pharmaceutical carrier or diluent.

As noted above, the compounds of Formula I exist as optical isomers. In such cases greater pharmacological activity or other beneficial attribute may be found with respect to a particular isomer and in such instances administration of such isomer may be preferred.

A representative formulation suitable for oral administration is a tablet prepared by standard tabletting techniques and containing the following:

| Ingredient: | Parts by weight |
| --- | --- |
| 2-(p-methoxyphenyl) - 1,6 - diazabicyclo[4.4.1]undecane hydrochloride | 30 |
| Tragacanth | 2 |
| Lactose | 59.5 |
| Corn starch | 5 |
| Talcum | 3 |
| Magnesium stearate | 0.5 |

The intermediate compounds of Formula V are also useful as hypotensives and anti-depressants and for these uses can be administered in the same manner and at the same dosage levels as previously indicated for compounds of Formula I.

The following example shows representative compounds contemplated by this invention and the manner in which such compounds are prepared. However, it is to be understood that the example is intended for the purpose of illustration only and is not intended as in any way limiting the scope of the invention which is defined in the appended claims.

EXAMPLE 2-(p-methoxyphenyl)-1,6-diazabicyclo[4.4.1]undecane

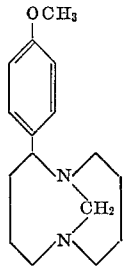

Step A. Preparation of N-[3-(p-methoxybenzoyl)propionyl]hexahydropyridazine.—To a mixture of 50.6 g. of 3-(p-methoxybenzoyl)propionic acid and 500 ml. of chloroform, cooled in an ice-bath, is added dropwise with stirring, a solution of 26.5 g. of ethyl chlorocarbonate in 150 ml. of chloroform. The resulting mixture is stirred for 1 hour and then there is added thereto, dropwise with stirring, a solution of 20.8 g. of hexahydropyridazine in 150 ml. of chloroform. The ice-bath is then removed and the stirring continued overnight at room temperature. The resulting mixture is then washed first with 50 ml. of 1 N sodium carbonate, then with 100 ml. of a saturated aqueous solution of sodium chloride and finally with 100 ml. of water. The washed chloroform layer is then evaporated on a rotary evaporator to obtain (Keto form) N-[3-(p-methoxybenzoyl)propionyl]hexahydropyridazine as an oil. The enol form is 4-(p-methoxyphenyl)-4-hydroxy-3,4,6,7,8,9-hexahydropyridazino[1,2-a]pyridazin-1(2H)-one.

Step B. Preparation of 4-(p-methoxyphenyl)-6,7,8,9-tetrahydropyridazino[1,2 - a]pyridazin-1(2H)-one.—To a flask equipped with a Dean-Stark tube is added 56 g. of N - [3 - (p-methoxybenzoyl)propionyl]hexahydropyridazine, 750 ml. of benzene and 2.5 g. of p-toluenesulfonic acid. The mixture is stirred and refluxed until water ceases to separate, then washed first with 25 ml. of 1 N sodium carbonate, then with 50 ml. of a saturated aqueous solution of sodium chloride and finally with 50 ml. of water. The organic layer is then evaporated in vacuo and the residue crystallized from diethyl ether to obtain 4-(p-methoxyphenyl) - 6,7,8,9 - tetrahydropyridazino[1,2-a]pyridazin-1(2H)-one, M.P. 114–118° C. The hydrochloride salt thereof, M.P. 154–156° C., is obtained by dissolving the free base in methylene chloride-diethylether (1:1) and treating the resulting solution with hydrogen chloride gas.

Step C. Preparation of 4-(p-methoxyphenyl)-3,4,6,7,8,9-hexahydropyridazino[1,2-a]pyridazin-1(2H)-one. — A mixture of 14.0 g. of 4-(p-methoxyphenyl)-6,7,8,9-tetrahydropyridazino[1,2 - a]pyridazin-1(2H)-one, 75 ml. of acetic acid and 0.7 g. of platinum dioxide is hydrogenated (Parr hydrogenation bottle) at room temperature and 50 p.s.i. with one mole of hydrogen is taken up. The mixture is then filtered and the filtrate evaporated in vacuo. The residue is made basic (pH 10) with 2 N sodium hydroxide and then extracted three times with 50 ml. (each) of chloroform. The chloroform extracts are combined and evaporated in vacuo to obtain 4-(p-methoxyphenyl)-3,4,6,7,8,9-hexahydropyridazino[1,2-a]pyridazin-1(2H)-one.

The free base is dissolved in diethyl ether and the resulting solution treated with hydrogen chloride gas. The precipitated hydrochloride salt, M.P. 174–176° C., is recovered by filtration.

Step D. Preparation of 1-(p-methoxyphenyl)-1,2,3,4,6,7,8,9 - octahydropyridazino[1,2-a]pyridazine.—A mixture of 22.8 g. of 4-(p-methoxyphenyl)-3,4,6,7,8,9-hexahydropyridazino[1,2-a]pyridazin-1(2H)-one, 6.7 g. of lithium aluminum hydride and 750 ml. of diethyl ether is refluxed with stirring for 96 hours and then cooled in an ice-bath. To the cooled mixture is then added dropwise 13.4 ml. of 2 N sodium hydroxide and 20 ml. of water. The resulting mixture is then filtered and the filtrate evaporated on a rotary evaporator to obtain 1-(p-methoxyphenyl)-1,2,3,4,6,7,8,9 - octahydropyridazino[1,2 - a]pyridazine as an oil which upon distillation affords product (free base), B.P. 205° C./16 mm.

The hydrochloride salt thereof, M.P. 153–156° C., is obtained by dissolving the free base in diethyl ether, treating the resulting solution with hydrogen chloride gas and isolating the precipitated salt by filtration.

Step E. Preparation of $N_5$-methyl iodide salt of 1-(p-methoxyphenyl) - 1,2,3,4,6,7,8,9-octahydropyridazino[1,2-a]pyridazine.—To a flask equipped with a stirrer and dropping funnel is added 100 ml. of dry diethyl ether and 12.7 of 1-(p-methoxyphenyl)-1,2,3,4,6,7,8,9-octahydropyridazino[1,2-a]pyridazine. To the resulting solution is added, dropwise while stirring, a solution of 14.7 g. of methyl iodide in 25 ml. of dry diethyl ether. The resulting mixture is stirred overnight at room temperature and the resulting solids filtered off to obtain the $N_5$-methyl iodide salt of 1-(p-methoxyphenyl)-1,2,3,4,6,7,8,9-octahydropyridazino[1,2-a]pyridazine, M.P. 212–215° C.

Step F. Preparation of 2-(p-methoxyphenyl)-1,6-diazabicyclo[4.4.1]undecane.—To a flask equipped with a magnetic stirrer, and blanketed with nitrogen, is added 1.7 g. of sodium and 50 ml. of dry methanol. After the sodium has reacted there is added 9.0 g. of $N_5$-methyl iodide salt of 1-(p-methoxyphenyl)-1,2,3,4,6,7,8,9-octahydropyridazino[1,2-a]pyridazine in 60 ml. of methanol. The resulting mixture is refluxed with stirring for four days, then the methanol evaporated off and the residue treated with 50 ml. of water and 50 ml. of a saturated aqueous solution of sodium chloride and then dried over anhydrous sodium sulfate. The dried chloroform layer is then evaporated on a rotary evaporator to obtain 2-(p-methoxyphenyl)-1,6-diazabicyclo[4.4.1]undecane as an oil. The oil thus obtained is dissolved in pentane, the resulting solution filtered to remove any insoluble material and then evaporated on a rotary evaporator. The resulting oil is dissolved in diethyl ether, the resulting solution treated with dry hydrogen chloride gas and the precipitated salt removed by filtration to obtain hygroscopic 2-(p-methoxyphenyl)-1,6-diazabicyclo[4.4.1]undecane hydrochloride, M.P. 175–185° C.

What is claimed is:
1. A compound selected from the group consisting of pyridazines of the formula:

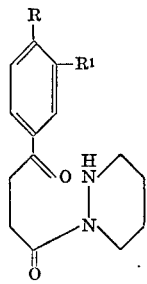

and tautomers thereof, whereineach of R and R¹ represent hydrogen, chloro, fluoro, or straight chain lower alkoxy containing 1 to 4 carbon atoms.

2. The compound of claim 1 which is N-[3-(p-methoxybenzoyl)propionyl]hexahydropyridazine.

3. The compound of claim 1 which is 4-(p-methoxyphenyl) - 4-hydroxy-3,4,6,7,8,9-hexahydropyridazino[1,2-a]pyridazin-1(2H)one.

4. A compound of the formula

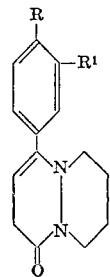

wherein each of R and R¹ are as defined in claim 1.

5. The compound of claim 4 which is 4-(p-methoxyphenyl) - 6,7,8,9-tetrahydropyridazino[1,2-a]pyridazin-1(2H)-one.

6. A compound of the formula

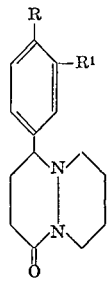

wherein each of R and R¹ are as defined in claim 1.

7. The compound of claim 6 which is 4-(p-methoxyphenyl)-3,4,6,7,8,9-hexahydropyridazino[1,2-a]pyridazin-1(2H)-one.

8. A compound selected from the group consisting of pyridazines of the formula

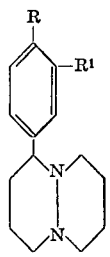

and the non-toxic pharmaceutically acceptable acid addition and $N_5$-methyl halide salts thereof, wherein each of R and R¹ are as defined in claim 1.

9. The compound of claim 8 which is 1-(p-methoxyphenyl) - 1,2,3,4,6,7,8,9-octahydropyridazino[1,2-a]pyridazine.

10. The compound of claim 8 which is the $N_5$-methyl iodide salt of 1-(p-methoxyphenyl)-1,2,3,4,6,7,8,9-octahydropyridazino[1,2-a]pyridazine.

References Cited
UNITED STATES PATENTS
3,539,567 11/1970 Doebel et al. ...... 260—250 A
3,557,108 1/1971 Bellasio et al. ...... 260—250 A NICHOLAS S. RIZZO, Primary Examiner U.S. Cl. X.R.
424—250